INVENTOR.
ROBERT L. BUTTS
BY Paul, Paul & Moore
ATTORNEYS

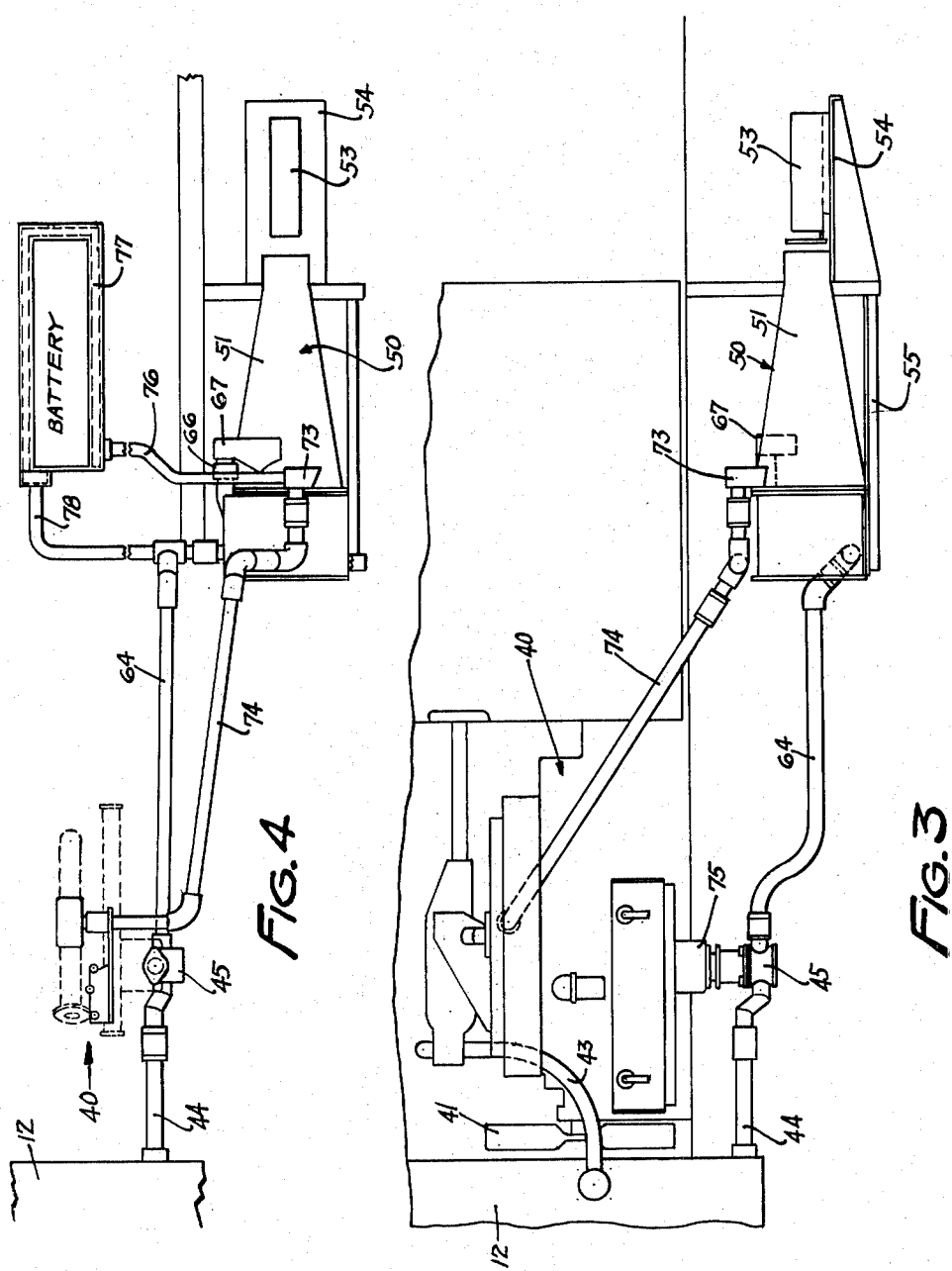

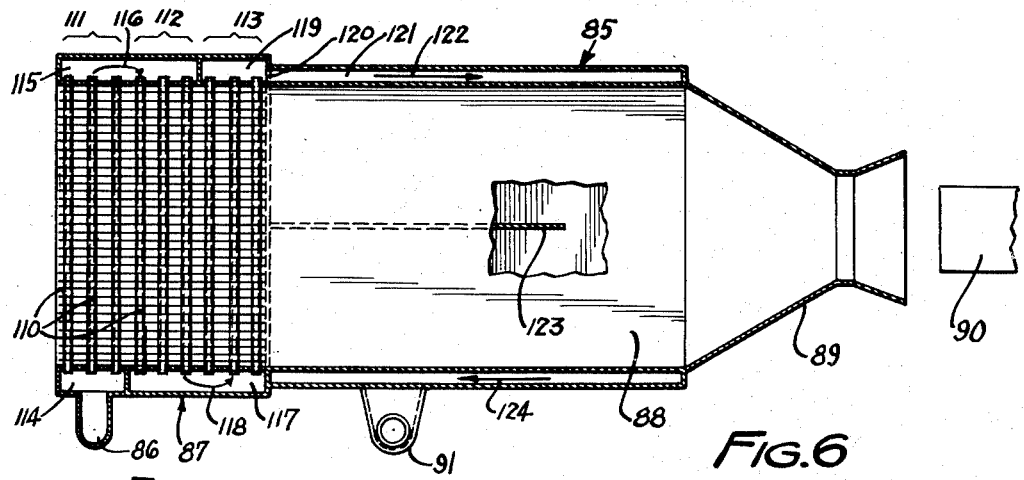
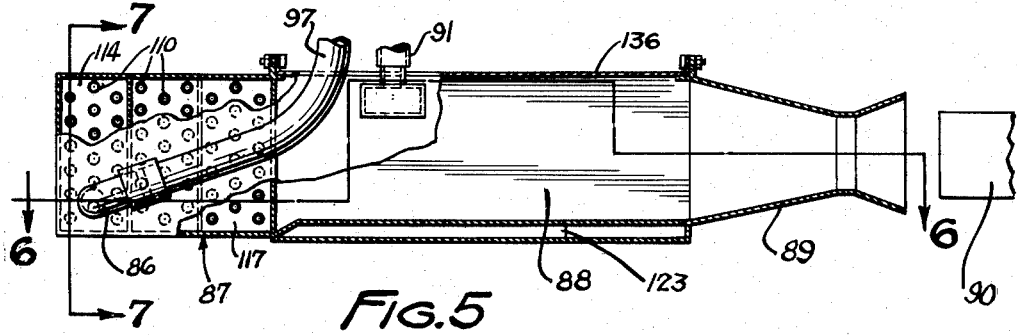
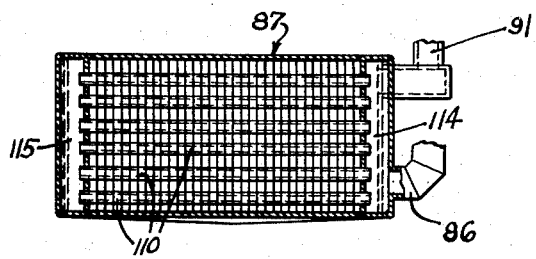

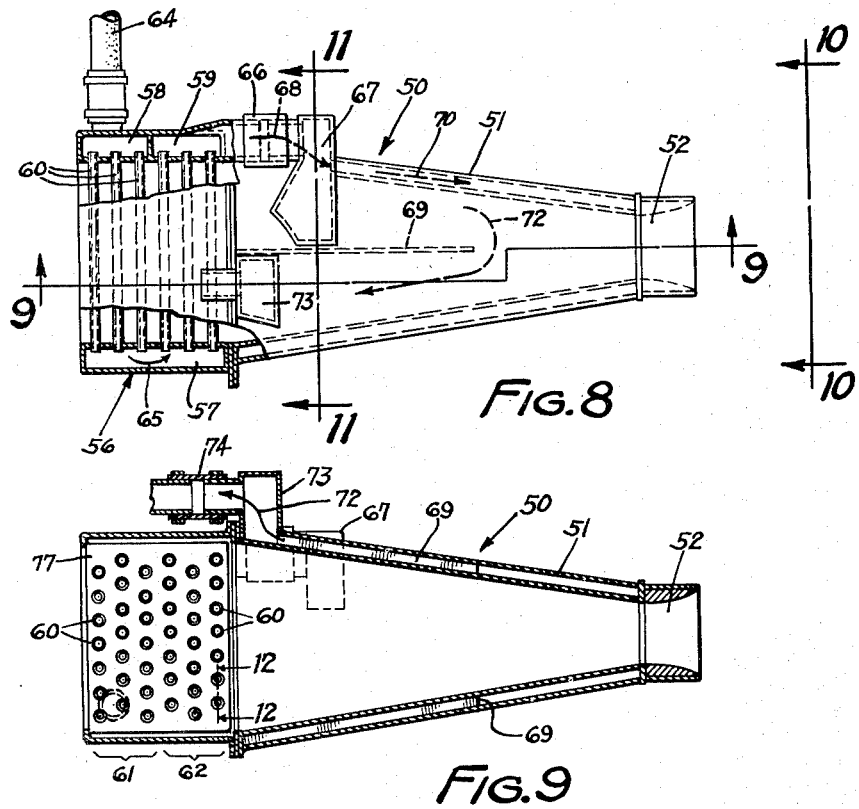
FIG. 8
FIG. 9
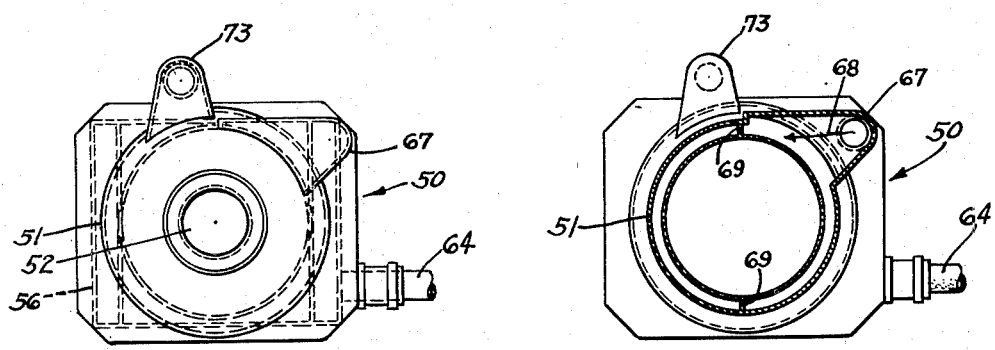
FIG. 10
FIG. 11
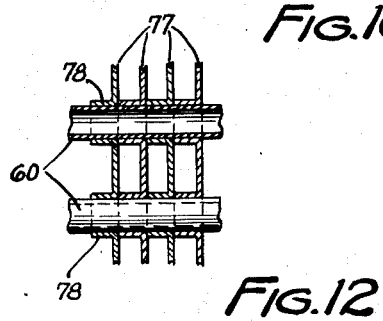
FIG. 12

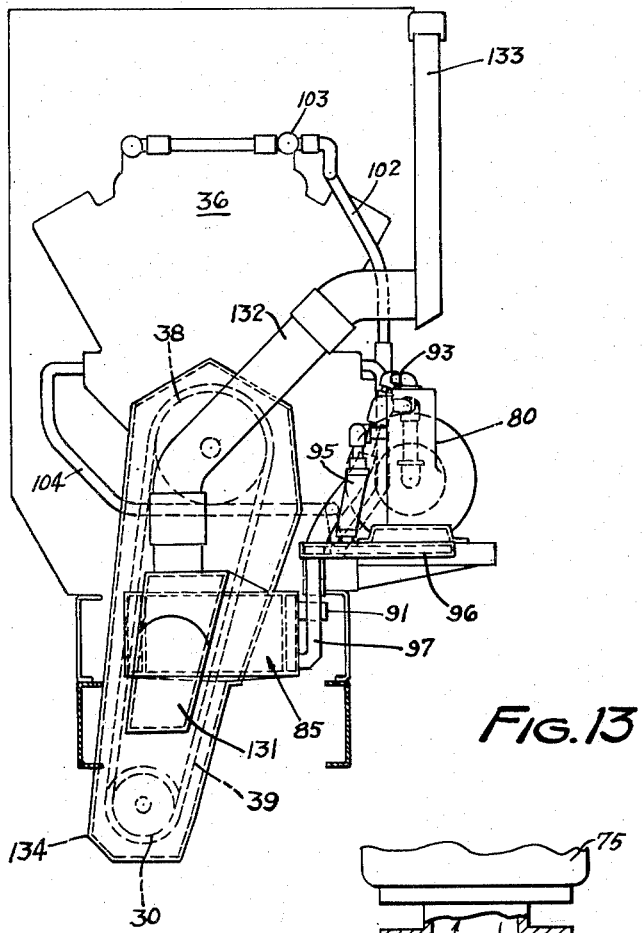
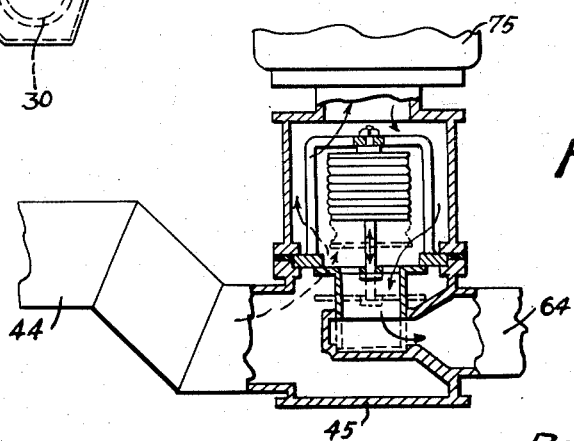

Patented Mar. 3, 1953

2,630,106

UNITED STATES PATENT OFFICE 2,630,106

PREHEATING DEVICE FOR STARTING INTERNAL-COMBUSTION ENGINES

Robert L. Butts, Minneapolis, Minn., assignor to Wm. Bros Boiler & Manufacturing Co., Minneapolis, Minn., a corporation of Minnesota Application June 26, 1950, Serial No. 170,437

15 Claims. (Cl. 123—142.5)

This invention relates to engine starting devices and is particularly directed to engine starting devices for initiating the operation of automotive and other internal combustion engine equipment at exceedingly low temperatures, such as −50° F. to −70° F. In the operation of internal combustion engines in regions where climatic cold ranges from 25° below zero downwards, the starting of internal combustion or automotive engine equipment is accompanied by extreme difficulty, due to the fact that the oil in the engine will congeal to solid consistency, thus defying turning over the engine, even though great amounts of power are applied to the starting crank or through a starting engine. Yet, the use of internal combustion engine equipment is required under such extremely cold climatic conditions and heretofore starting has been accomplished only by make-shift methods and with great difficulty. In some of the prior methods the oil was systematically drained from the internal combustion engine while still warm and removed to a house or building where the oil could be kept warm until the next starting operation was to be accomplished, whereupon the warm oil was heated and re-introduced into the engine and in this way the engine heated enough so as to permit starting. In other instances, such as the starting of diesel equipment during the building of the Alcan Highway and on other arctic jobs, the crews have simply built small fires under the crankcase of the equipment, thus heating the equipment sufficiently so as to permit a start. These methods are cumbersome, costly and dangerous.

It is an object of the present invention to provide an improved heating system for starting internal combustion engines under conditions of extreme cold.

It is another object of the invention to provide an improved cold weather starting system for internal combustion engines.

It is a further object of the invention to provide, in conjunction with a main internal combustion engine having a smaller internal combustion engine for starting the same, a heating system for initially heating the internal combustion engine and for use when started to help heat and start the main engine with or without direct heating of the main engine.

It is a further object of the invention to provide a heating system for internal combustion engines utilizing radiated and circulated heat.

It is another object of the invention to provide a compact and efficient heat exchange system in conjunction with an internal combustion engine so as to permit the rapid warm-up and starting of the engine.

It is a further object of the invention to provide means in conjunction with internal combustion engines for warming up the power transmission belts of such engines and equipment prior to the time when the engine is started so as to reduce belt breakage.

It is another object of the invention to provide an improved internal combustion engine starting system whereby not only the crankcase but also the circulating coolant of the internal combustion engine may be rapidly heated prior to starting.

It is a further object of the invention to provide an improved gas to liquid heat exchanger and improved construction thereof.

It is another object of the invention to provide in an automotive internal combustion engine system an improved preheating water circulating system.

It is a further object of this invention to provide an improved heating means wherein the combustion chamber of the improved heating means is of such configuration as to produce a static pressure which forces the hot burner gases of the improved heating means through the heat exchanging apparatus integral therewith.

It is a further object of this invention to provide an internal combustion engine starting system wherein improved means are provided to shut off a portion of the coolant of the internal combustion engine and to heat only a portion of said coolant.

It is a further object of this invention to provide, in conjunction with a main internal combustion engine having a smaller internal combustion engine for starting the same, a heating system wherein thermo-siphon circulation of the coolant is provided prior to the starting of the smaller engine, and pumping circulation of the heated coolant is provided after the smaller engine is started.

It is a further object of this invention to provide an internal combustion engine starting system wherein a counterflow of combustion gases and coolant is provided so as to effect efficient heat transference.

It is a further object of this invention to provide quick heating of an internal combustion engine with a heater occupying a small space.

Other and further objects of the invention are those inherent in the apparatus herein illustrated, described and claimed.

The invention is illustrated with reference to the drawings in which corresponding numerals refer to the same parts and in which Figure 1 is a side elevational view, partly broken away, of an automotive truck provided at its forward end with a snow plow which is driven by a separate internal combustion engine mounted on the truck chassis;

Figure 3 is a fragmentary side elevational view of the truck engine of Figure 1, together with its preheating circulating system;

Figure 4 is a fragmentary plan view corresponding to Figure 3 of the truck automotive engine preheating circulating system;

Figure 5 is a longitudinal vertical sectional view of the heat exchanger used in connection with the separate power plant shown in Figure 2;

Figure 6 is a horizontal sectional view taken along the line and in the direction of arrows 6—6 of Figure 5;

Figure 7 is a transverse sectional view taken in the direction of arrows 7—7 of Figure 5;

Figure 8 is a plan view, partly broken away, showing the heat producing unit of the automotive engine heating system of Figures 1, 3 and 4;

Figure 9 is a vertical sectional view taken along the line and in the direction of arrows 9—9 of Figure 8;

Figure 10 is an end elevational view taken in the direction of arrows 10—10 of Figure 8;

Figure 11 is a transverse sectional view taken along the line and in the direction of arrows 11—11 of Figure 8;

Figure 12 is a fragmentary sectional view taken along the line and in the direction of arrows 12—12 of Figure 9;

Figure 13 is a vertical sectional view of the belt preheating portion of the apparatus taken along the line and in the direction of arrows 13—13 of Figure 2.

Figure 14 is a fragmentary vertical sectional view of the thermostatically controlled valve mechanism in the engine cooling fluid circuit.

Figure 1:
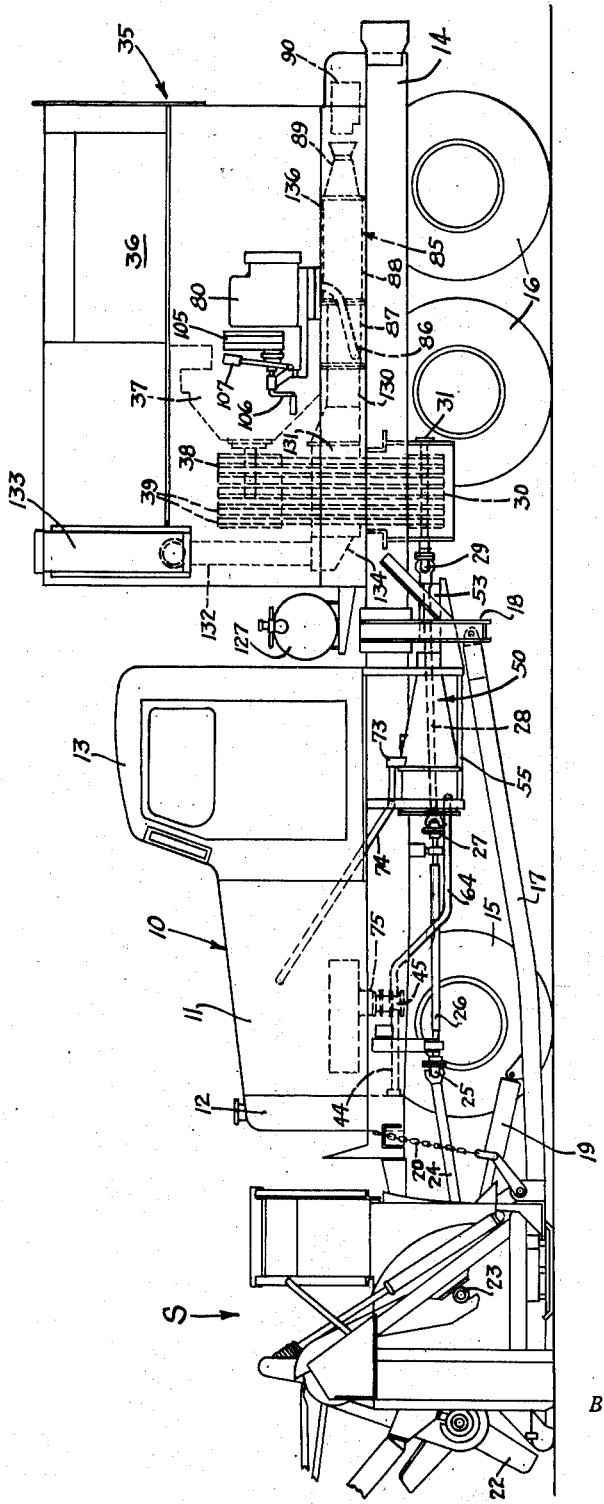

Referring to Figure 1 there is illustrated an automotive vehicle or truck generally designated 10 having an engine space 11, housing an engine 40, radiator 12, operator cab 13 and load-carrying chassis 14. The truck also includes steerable front wheels 15 and 4—4 tandem rear driving wheels 16. Upon the truck there is mounted a snow plow unit generally designated S which is attached to the truck by means of pusher beams 17 fastened to the vertical sub-frame 18. The plow is arranged with usual controls 19 and 20 so as to permit it to be raised or lowered and includes a rotary rake 22 and rotary snow impelling units 23 which are driven by drive shaft 24 through universal joints 25, shaft 26, universal joint 27, shaft 28 and universal joint 29 from a multiple V-belt power pulley 30 which is mounted upon the framework 31 beneath the truck load-carrying frame 14. Pulley 30 is driven through belts 39 on pulley 38 of engine 36 as hereinafter described in detail. The snow plow S, its connection to the truck and the details of construction, per se, form no part of the present invention and are mentioned herein as being merely illustrative of types of loads which are frequently used in arctic operations. The truck 10 having engine 40 and snow plow S having engine 36 are thus merely illustrative of types of internal combustion engine equipment to which the instant invention is applied. The present invention is, of course, applicable to any of a wide variety of internal combustion engines.

As a part of the snow plow unit there is supplied an internal combustion engine power plant generally designated 35 which has a very large horsepower engine 36 operating through the clutch 37 to a multiple V-belt power take-off pulley 38 which is connected by a plurality of V-belts 39 to the driven pulley 30, which, as explained, is connected through a universal jointed drive shaft to the load-consuming equipment, which in this case is illustrated by the snow plow S.

The problem in this exemplary equipment is not only to start the automotive truck engine 11, but also the auxiliary power plant 35.

Attention is first directed to the automotive truck engine which is shown somewhat in detail in Figure 3. The engine 40 is provided with a cooling fan 41 for normal operation and with a radiator 12 through which circulation is normally accomplished by means of upper hose connection 43 which extends to the cross flow radiator 12 from which the cooled coolant fluid returns by way of the lower hose connection 44 to the valve 45 which constitutes a part of the present invention. In the present instance there is provided a running board mounted heater unit generally designated 50 which serves to heat the automotive engine 40 and its starting battery. In this instance the engine 40 is started by an electric starter motor of usual type. Referring to Figures 8–12 there is illustrated one form of heat exchange unit of the present invention. In this unit there is provided a conical double walled chamber 51 having a Venturi nozzle section 52 into which the blast from burner 53 is directed (Figures 1, 3 and 4), the burner being mounted upon pad 54 which is an extension of the running board 55. At the forward or enlarged end of the double wall conical chamber 50 there is a tubular heat exchanger section generally designated 56 having a header portion at 57 and a divided header portion 58—59. A bank of tubes 60 extends across horizontally from the header 57 to the headers 58 and 59, the first three vertical lines of tubes shown over the bracket 61 in Figure 9 being connected from header 57 to the header 58 and the last three vertical lines of tubes 62 being connected from header 57 to the header 59. It will be noted that the water inlet connection is provided at 64, which extends to the valve 45. The cold coolant fluid thus enters the header 58 and flows across the bank 61 of tube 60 and into the header 57, whence the flow returns to the bank 62 of tubes, as indicated by the arrow 65, whence the flow continues to the header 59. From the header 59 the flow continues through the connection 66 to an inlet flange 67 through which the fluid, which is thus partially heated, enters between the double walls of portion 51 of the heater, the flow being indicated by the arrow 68. The double walls 51 are divided vertically by the fin 69—69, as shown in Figure 11, and hence the incoming fluid entering through connection 67, as indicated by arrow 68, flows first rearwardly through that portion of the double walled chamber which is nearest the truck, as indicated by the arrow 70. The dividing walls 69—69 extend only partially throughout the length of the conical heat exchanger and the flow hence is enabled to continue via arrow 72, as shown in Figure 8, and return to the outlet connection 73, which is connected to the top of engine 40 by means of pipe 74.

Valve 45 is of the heat operated type and is arranged so as to cut off flow from the engine coolant entrance pipe 75 to the pipe 64 when the coolant temperature reaches a predetermined sufficiently high degree and then to transfer the flow to the radiator connection 44. Hence, when the burner 53 is started flow initially takes place through the heat exchanger 50, thence through pipe 74 to the top of engine 40 and after passing through the passages of the engine the flow returns through the connection 75 and thence through the valve 45 to pipe 64, the flow through radiator connections 43 and 44 at this time being stopped by the valve 45. When the engine 40 has heated sufficiently the valve 45 cuts off the flow to pipe 64 and opens the passage from 75 to 44, thus permitting normal engine circulation to take place. At this time the heat from burner 53 is stopped and the heat exchanger 50 then remains idle until the next start.

It will be noted that a connection is provided from the hot coolant outlet 73 of Figure 4 via line 76 to a heater pad 77, which is a double walled horizontal plate through which the heated fluid can pass to return line 78, which is connected to the inlet pipe 64 of the engine return to heater 50.

Referring to Figure 12, the tubes 69 of the heat exchanger may, if desired, be provided with a plurality of fins 77 each of which is provided with a punched down circular collar at 78 through which the tubes 60 are adapted to pass. The circular collars are of sufficient height so as to form spacers for the fins 70 and the tubes 60 are firmly pressed into intimate contact with the collar 78 by expanding the tubes. No soldered connections are used and adequate heat transmission is obtained. As much as 200,000 B. t. u. per hour can be produced in a unit as illustrated in Figures 1 and 8-12, which is mounted upon the running board of a truck, as shown in Figure 1.

Figure 2:
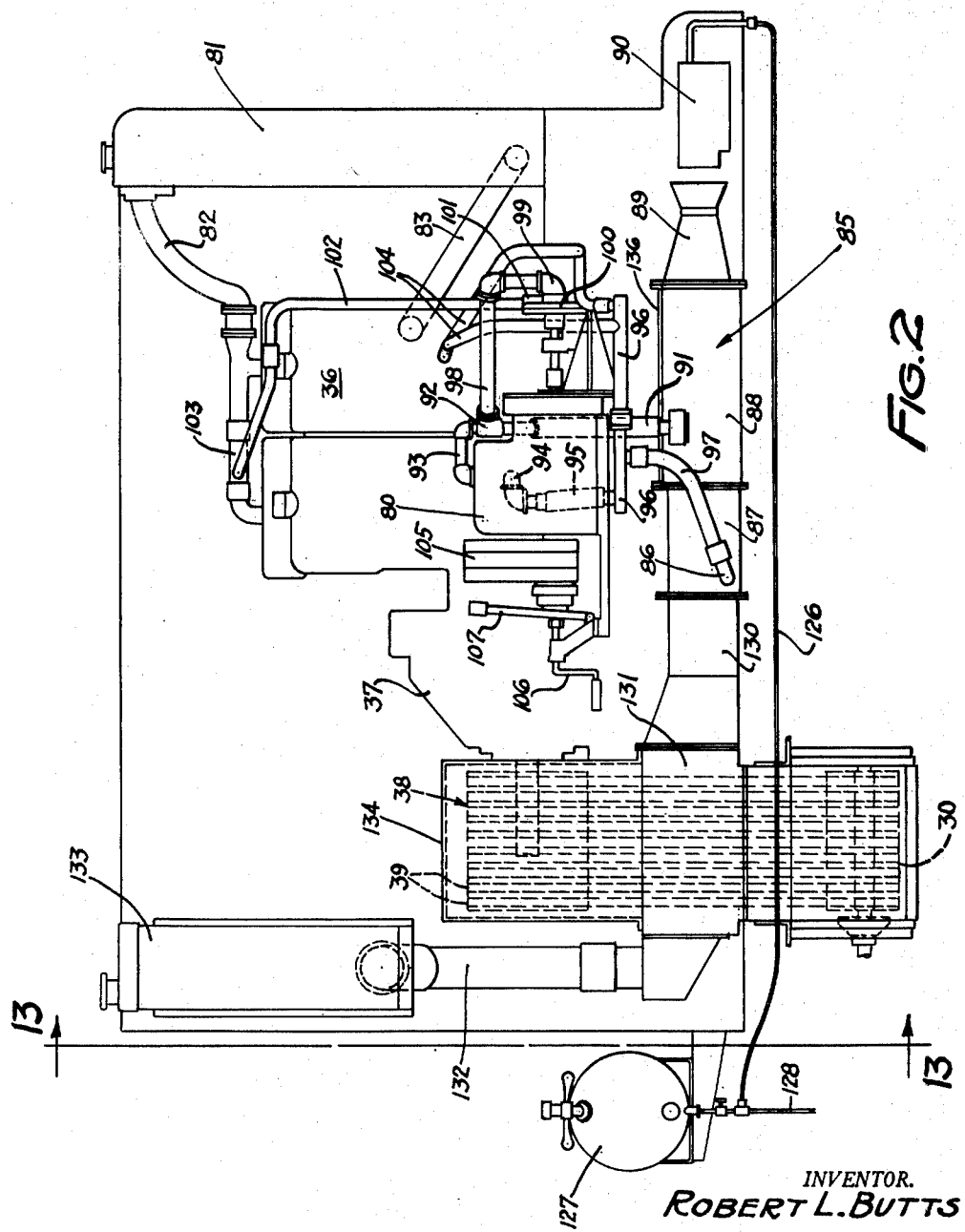
Figure 2 is an enlarged detail view of the separate internal combustion engine power plant of the device shown in Figure 1, together with the preheating arrangements thereof, which are also shown in Figure 1.

Referring to Figure 2, the large internal combustion engine 36, which in the illustrated embodiment is for supplying power to a snow plow S, but which is illustrative of any portable or stationary power plant used under extreme arctic conditions, is provided with a small internal combustion engine 80 at the side thereof for starting the engine 36 and is provided with a radiator 81 and upper and lower hose connections 82 and 83. Beneath the engine there is a heat exchanger generally designated 85, presently to be described, which has a fluid inlet at 86, a heat exchanging section 87, another heat exchanging section at 88, a burner inlet at 89, for which burner 90 is provided. The heated fluid from the heat exchanger 85 is delivered at outlet 91 which extends to T 92, whence one fluid circuit extends via pipe 93 to what is normally the cooling fluid outlet of the starting engine 80. The fluid circuit extends through the starting engine 80 water jacket to what is normally the cooling fluid inlet 94 of the starting engine 80, from whence the fluid circuit extends through pipe 95 to the header 96 from which circuit connection 97 extends to the inlet 86 of the heat exchanger. From the T 92 a circuit also extends via pipe 98 to the inlet 99 of a centrifugal pump 100, which is driven from the starting engine 80. From the outlet 101 of the centrifugal pump a fluid circuit extends via pipe 102 to what is normally the cooling fluid outlet pipe 103 of the large engine 36, the fluid circuit continuing through the cooling passages of the large engine 36 to a pair of return pipes 104 which are connected to the header 96, through which the circuit returns to the inlet pipe 97 of the heat exchanger 85. The starting engine 80 is provided with a belt drive 105 to a Bendix starting pinion of main engine 36, a starting crank 106, together with a hand clutch 107 by means of which the starting engine can be engaged to the ring gear of the large engine 36 for starting the latter.

Referring to Figures 5, 6 and 7 the heat exchanger generally designated 85 has a multiple tube heat exchange portion 87 and a jacketed heat exchanger portion 88, an inlet Venturi neck 89, through which the flame from burner 90 enters the unit. The heat exchanger tubular section 87 is composed of a plurality of tube banks indicated under the brackets 111, 112 and 113. The inlet pipe 86 makes connection with a header section 114 which is connected to one end of the bank 111 of tubes 110 and the flow from these tubes is into a header section 115 through which the flow then returns, as indicated by arrows 116 through the bank of tubes 112 and the flow thence continues through the header section 117, as indicated by the arrows 118 into the bank of tubes 113, where the flow is delivered by the bank of tubes to the header section 119. It will be noted that the header section 119 is connected by the port 120 to the jacket portion 121, through which flow thence continues in the direction of arrow 122 towards the burner sufficiently so as to pass around interior baffle 123, whence the flow then returns as indicated by arrow 124 to the heater fluid outlet at 91. The burner 90 is served by a fuel supply pipe 126 which is connected to the fuel supply tank 127, as is also the burner 53 which is connected by pipe 128 to the fuel tank.

The heated gases of combustion from burner 90, after passing through the heat exchanger portions 88 and 87 are delivered to the duct-work 130 where the heated gases are conducted through a housing 131 and thence to a stack 132 which exhausts to the atmosphere through the vertical rectangular stack 133. The multiple V-belts 39 which run over the driven pulley 36 and the driving pulley 38 are wholly enclosed by the housing 134. It will be noted that the duct-work 130 passes between the run of belts 39 and thence heat is delivered from the flat vertical sides of the duct 131 to the adjacent portion of the belt 39 and to the interior of the wholly enclosed belt housing 34. Accordingly, the entire interior of housing 34 is heated indirectly, both by conduction and radiation from the duct-work portion 131 and the belts 39 are pre-warmed so as to make them sufficiently flexible for starting without cracking. It may be noted in passing that when a V-belt of rubber composition is reduced to a temperature such as —50° F. or lower, it becomes so brittle that breaking occurs very rapidly, but that if the belt is preliminarily warmed it can be run without harm.

Referring again to Figures 2 and 5, it will be noted that the top 136 of portion 88 of the heat exchanger 85 is flat and is exposed so as to radiate heat to the crankcase of the large engine 36 which is immediately above the top 136 of the heater 85. During operation the burner 90 causes the top 136 to become almost red hot, very quickly and the heat of the top 136 is accordingly radiated to the crankcase of the motor 36 and heats the lubricating oil within the crankcase of the motor 36. In the meantime the tubular heat exchanger 87 and the jacketed portion of the heat exchanger 88 causes the fluid in the fluid circuits previously described to become heated and flow occurs due to thermosiphon action from the hot fluid outlet 91 of the heat exchanger 85 through the T 92 and pipe 93 to what is normally the cooling fluid outlet of the starting engine 80 and thence through the jackets of the starting engine to what is normally the inlet 94 of the starting engine 80 and thence through pipe 95 to header 96 and to the inlet of the heat exchanger 85. At the same time there is a small but not very substantial flow through the circuit composed of pipe 98, inlet 99, to centrifugal pump 100, outlet 101 of the centrifugal pump and pipe 102 to the header 103 of the large engine 36 and thence via the return pipes 104 from the large engine to the header 96 and thence to the heat exchanger 85. The flow through this latter circuit is not very large due to the impediment caused by the centrifugal pump 100 which at that time is not working. After the starting engine has been heated, and this occurs very quickly due to the heat output of the heater 85, as applied to the relatively small engine 80, the engine 80 can be started by hand cranking by means of the hand crank 106. The engine 80 then starts but at this time the engine 80 is not clutched in so as to start the large engine 36, but merely drives the centrifugal pump 100. The operation of the centrifugal pump causes a negative pressure to be drawn on the T 92 and hence flow is pulled reversely through the engine 80, the flow entering the pipe 95 and inlet 94 and thence passing through the engine 80 to outlet 93 and T 92. At the same time flow is drawn from the heat exchanger 85 through outlet 91 to the T 92. The flows thus combined at T 92 are drawn through pipe 98 into the inlet 99 of the centrifugal pump 100 and are delivered as a full flow to the pipe 102 which is circulated by the pump 100 through the water jacket of the large engine 36 whence they are returned via pipes 104 to the header 96. In this way the small engine 80 which is operating acts to augment the heat delivered by the heating machine 85. After a matter of ten minutes or so the large engine 36 will have been warmed sufficiently by the circulated heated "coolant fluid" so as to permit its starting, it being remembered that in the meantime the radiated heat from the top 136 of the heater 85 has caused considerable warming of the lubricating oil in the crankcase of the large engine 36. The clutch 107 of starting engine 80 is then moved to engaging position and the small starting engine 80 starts the large engine 36 which then commences normal operation. In the meantime the belts 39 have been warmed sufficiently so that they are not cracked when the large engine 36 is started and its clutch engaged. The burner 90 is then turned off and the small engine 80 is likewise stopped, the flow through the large engine 36 and its radiation 81 being then controlled by the normal coolant circulating pump.

As many apparently widely different embodiments of this invention may be made without departing from the spirit and scope thereof, it is to be understood that I do not limit myself to the specific embodiments herein.

What I claim is:

1. A heat exchanger comprising a double walled enclosure, having an inlet thereinto for the introduction of hot combustion gases, an outlet therefrom comprising a duct having heat exchange tubes extending thereacross, headers for said tubes connected thereto so as to permit flow across a bank of said tubes most removed from the inlet of hot combustion gases and thence across another bank of tubes nearer the inlet of hot combustion gases, and thence into the double walled enclosure.

2. The apparatus of claim 1 further characterized in that said tubes are provided with fins, extending across the tube banks, said fins being apertured and flanged so as to permit the tubes to extend therethrough, the tubes being expanded into tight thermal contact with the fin and flanges at each aperture.

3. The apparatus of claim 1 further characterized in that a wall is divided longitudinally along the double walled chamber from the tube to a position closely adjacent the inlet for hot combustion gases.

4. The apparatus of claim 1 further characterized in that the double walled enclosure has a single walled portion forming a heat radiating surface for radiating heat in one direction.

5. The apparatus of claim 1 further characterized in that the inlet is of the Venturi type.

6. The apparatus of claim 1 further characterized in that the headers connected to the tubes permit a flow across a bank of said tubes most removed from the inlet of the hot combustion gases, and thence across another bank of tubes nearer the inlet of the hot combustion gases, and thence back across another bank of tubes nearer the inlet of the hot combustion gases, and thence into the double walled enclosure.

7. A heat exchanger comprising a double walled enclosure, having a Venturi inlet thereinto for the introduction of hot combustion gases, an outlet therefrom comprising a duct having heat exchange tubes extending thereacross, said heat exchanging tubes provided with fins, extending across the tube banks, said fins being apertured and flanged so as to permit the tubes to extend therethrough, the tubes being expanded into tight thermal contact with the fins and flanges at each aperture, headers for said tubes connected thereto so as to permit flow across a bank of said tubes most removed from the inlet of hot combustion gases and thence across another bank of tubes nearer the inlet of hot combustion gases, and thence into the double walled enclosure, said double walled enclosure being provided with a longitudinal partition extending from the tube banks to a position closely adjacent the inlet for the hot combustion gases.

8. A system for starting liquid cooled internal combustion engines having liquid flow jackets therein provided with an inlet and outlet and a crankcase at the bottom for containing lubricating oil, comprising in combination therewith a combustion burner for delivering hot gases, a jacketed heat exchanger for receiving the hot gases delivered by said burner, said heat exchanger being physically positioned beneath the crankcase of said engine, said heat exchanger comprising a fluid jacket for passage of fluid to be heated therethrough having a heated fluid outlet and an inlet, said heat exchanger being connected in fluid circulating relation to said engine, the heat exchanger also having a single wall which is heated to heat radiating temperatures, said wall being the upper surface of said heat exchanger, said heat exchanger being positioned so as to radiate heat from said upper wall to said motor crankcase.

9. A preheating system for an interanl combustion engine having liquid containing cooling jackets provided with an inlet and an outlet, a radiator for the engine having an inlet and an outlet connected in liquid circulating relationship to said engine cooling jacket outlet and inlet, respectively for normally cooling the engine, comprising a heater having a fluid heating jacket therein, fluid conduits connecting said heating jacket in fluid circulating relationship to the outlet of the engine and also to the inlet of the engine, and a temperature operated valve at said inlet of the engine and for closing off the cooling fluid circulating path between the engine and radiator until the engine temperature is raised to operating temperature, and then opening said connection between the inlet of the engine and the radiator and closing the connection between the inlet of the engine and the fluid heating jacket.

10. The system of claim 9 further characterized in that said engine is provided with a flexible belt power delivery drive, a casing around said power delivery drive and means for delivering heat at low temperatures, after passing through said heat exchanger, to said enclosure around said belt means.

11. A motor starting system for large liquid cooled internal combustion main engines comprising, in combination with said main engine, a starting engine, a burner, a heat exchange means connected to the burner for passage of heating gases therethrough for heating liquid, fluid connections between said heat exchange means and main and starting engines for circulating liquid to and from the heat exchange means and main and starting engines, a circulating pump connected to said starting engine to be driven thereby, said pump being connected in fluid circuit between the heat exchange means and main engine.

12. A motor starting system for large liquid cooled internal combustion main engines comprising, in combination with said main engine, a starting engine, a burner, a heat exchange means connected to the burner for passage of heating gases therethrough for heating liquid, fluid connections between said heat exchange means and main and starting engines for circulating liquid to and from the heat exchange means and main and starting engine so that substantially all the heated liquid from the heat exchange means is circulated by thermo-siphon circulation through the starting engine until said starting engine is started, and means whereby the flow of the heated liquid from the heat exchange means is then diverted to circulate through the main engine, and is augmented by the flow of heated liquid from the outlet of the starting engine.

13. The apparatus of claim 12 further characterized in that the means for diverting the flow of heated liquid from the starting engine to the main engine after the starting engine is started is a circulating pump.

14. The apparatus of claim 12 further characterized in that the heat exchange means is situated below the main engine and has a heat radiating surface for radiating heat to the main engine crankcase.

15. The apparatus of claim 12 further characterized in that said main engine is provided with a flexible belt power drive connection, an enclosure around said belt, and heat duct work means connecting said enclosure and heat exchange means for delivering heat to said enclosure.

ROBERT L. BUTTS.

REFERENCES CITED

The following references are of record in the file of this patent:

UNITED STATES PATENTS

| Number | Name | Date |
| --- | --- | --- |
| 1,015,145 | Davis | Jan. 16, 1912 |
| 1,199,115 | Rohan | Sept. 26, 1916 |
| 1,236,416 | Fink | Aug. 14, 1917 |
| 1,316,021 | Doble | Sept. 16, 1921 |
| 1,460,668 | Good | July 3, 1923 |
| 1,637,596 | Turner | Aug. 2, 1927 |
| 1,769,994 | Hendryx | July 8, 1930 |
| 2,224,544 | Keller | Dec. 10, 1940 |
| 2,399,941 | Resek | May 7, 1946 |
| 2,399,942 | Resek | May 7, 1946 |